TRANSISTOR LOGIC CIRCUITS EMPLOYED IN A HIGH SPEED ADDER

Filed Dec. 20, 1965 Sheet 1 of 4

INVENTOR.
JOHN J. KARDASH

BY David M. Kay

AGENT.

INVENTOR.
JOHN J. KARDASH

David M. Keay
AGENT.

April 22, 1969 J. J. KARDASH 3,440,412

TRANSISTOR LOGIC CIRCUITS EMPLOYED IN A HIGH SPEED ADDER

Filed Dec. 20, 1965

INVENTOR.
JOHN J. KARDASH

BY David M. Keay
AGENT.

INVENTOR.
JOHN J. KARDASH

BY David M. Kaay
AGENT.

United States Patent Office 3,440,412

Patented Apr. 22, 1969

3,440,412

TRANSISTOR LOGIC CIRCUITS EMPLOYED IN A HIGH SPEED ADDER

John J. Kardash, South Acton, Mass., assignor to Sylvania Electric Products Inc., a corporation of Delaware Filed Dec. 20, 1965, Ser. No. 514,928
Int. Cl. G06f *7/385*
U.S. Cl. 235—175 9 Claims

ABSTRACT OF THE DISCLOSURE

Full adder circuit amenable to fabrication as a monolithic integrated circuit network. The adder circuit receives an augend and an addend input signal and information signals related to the augend and addend signals of preceding stages, and is operable to produce a sum output signal and either independent carry signals when used as a look ahead fast carry adder stage or a dependent carry signal when used to consolidate all previous carry information.

Figure 1:
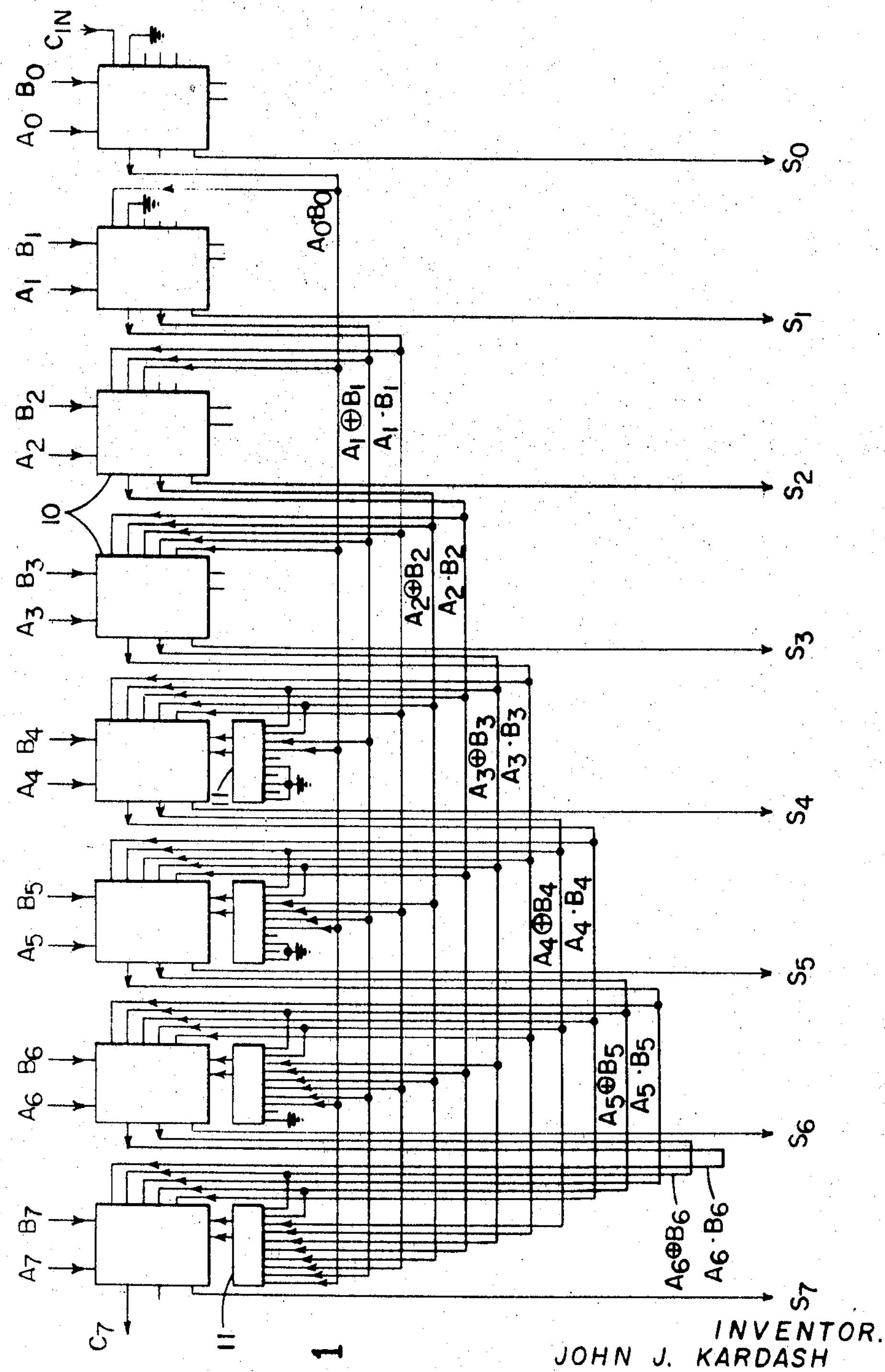

This invention relates to logic circuits used in digital computers. More particularly, it is concerned with transistor circuits employed in the high speed addition of two numbers.

In a digital computer two numbers are added in an arithmetic unit which includes several full added stages. Each full adder stage employs an augend bit, an addend bit, and a previous-carry bit to produce a sum and a carry output. The expression for the sum obtained from a full adder stage as defined in Boolean algebra terminology is $$S=A\cdot\overline{B}\cdot\overline{C}_P+\overline{A}\cdot B\cdot\overline{C}_P+\overline{A}\cdot\overline{B}\cdot C_P+A\cdot B\cdot C_P$$

where

A=augend
B=addend
$C_P$=previous-carry
S=sum.

As employed herein a letter symbol without a bar represents a binary "1." A bar over a letter symbol indicates the absence of a binary "1," or binary "0."

High speed digital computers usually employ arithmetic units of the parallel binary type. In this type of adder all corresponding augend and addend bits are summed simultaneously rather than one at a time. High speed operation of a parallel adder is obtained by employing a "look ahead" carry technique. In adders of this type the previous-carry bit to be summed with the augend and addend bits in the sum generator section of an adder stage is produced within the adder stake as determined by suitable carry information from every preceding stage of lower order. The carry information from the adder stage to all the succeeding stages of higher order is determined only from the augend and addend bits to that stage. That is, the carry information from each stage is independent of the carry information supplied to the stage. Thus, all carry information in the adder is supplied simultaneously to each stage avoiding the necessity of propagating information from stage to stage.

However, adders employing look ahead carry techniques require complex logic arrangements for handling the carry input information and producing a previous-carry signal for use at each stage. At each succeeding stage of higher order the logic becomes more complex and the number of components required becomes greater. Furthermore, it is frequently necessary that certain stages in parallel binary adders provide a dependent carry signal which is determined by the augend and addend information together with the previous-carry information into the stage rather than independent carry information which is dependent only on the augend and addend information. These adder stages require different logic arrangements thus increasing the complexity of the arithmetic unit.

Frequently, each adder stage in an arithmetic unit is formed by a suitable arrangement of compatible logic blocks each of which provides an AND, OR, or other basic logic function. Sections of the adder such as the sum generator which receive the augend, addend, and previous-carry signals and provides the appropriate sum signal according to the expression in col. 1 may require several basic logic blocks to perform the necessary logical operations. Thus, a multi-stage parallel binary adder with look ahead carry may be an exceedingly complicated array, particularly if each logic block includes the necessary buffering components to render all the inputs and outputs of the blocks compatible. If the basic logic blocks are each fabricated as a monolithic integrated circuit network, the space requirements for the multitude of individual networks and their interconnections becomes significant and much of the advantage obtained by employing monolithic integrated circuits is dissipated.

It is an object of the present invention, therefore, to provide improved logic circuits for use in digital computers.

It s also an object of the invention to provide an improved full adder circuit.

It is another object of the invention to provide an improved full adder circuit which provides a sum output and output signals for look ahead carry information to other adder stages.

It is a further object of the invention to provide a full adder circuit capable of providing either dependent or independent carry signals at an output terminal.

It is also an object of the invention to provide an improved three-input sum generator circuit.

Briefly, in accordance with the foregoing objects a full adder circuit according to the invention includes a carry information input circuit means which is operable in response to input signals applied thereto to produce a signal which is indicative of carry information at a carry information output connection. The adder also includes an augend input terminal for receiving a signal indicative of the augend bit and an addend input terminal for receiving a signal indicative of the addend bit. Augend input circuit means connected to the augend input terminal and addend input circuit means connected to the addend input terminal provide signals at augend and addend output connections, respectively, in response to the input signals at the augend and addend input terminals. A sum generator means which is connected to the carry information output connection, the augend output connection, and the addend output connection produces a signal at a sum output terminal indicative of the sum of the signals at the carry information input circuit means, the augend input terminal, and the addend input terminal.

An AND circuit means is connected to the augend and to the addend input terminals and is operable to produce a signal at an AND connection in response to coincident signals at the augend and addend input terminals. An OR circuit means is also connected to the augend and to the addend input terminals and is operable to produce a signal at an OR connection in response to a signal at either the augend or the addend input terminal.

Means are provided for making a connection between the carry information output connection and the AND connection thereby providing a signal at the AND connection when a signal is produced at the carry information output connection. A carry output circuit means is connected to the OR connection and to the AND connection and is operable to produce a signal at a carry output terminal in response to coincident signals at the AND and OR connections.

Thus, the foregoing circuit may be employed to produce an independent carry signal at the carry output terminal which is in response to coincident signals at the augend and addend input terminals. Or, by virtue of a connection between the carry information output connection and the AND connection a dependent carry signal is produced at the carry output terminal which is in response to the presence of a carry information signal from the carry information input circuit means together with the presence of a signal at either the augend or the addend input terminals.

It is a feature of the invention to employ a sum generator circuit having a first and a second pair of transistors. The base of one transistor of each pair is connected to the emitter of the other transistor of the pair, and the emitter of the one transistor of each pair is connected to the base of the other transistor of the pair. The collectors of the transistors of each pair are connected together. An augend connection is connected to one of the emitter-base connections of the first pair of transistors and an addend connection is connected to the other emitter-base connection of the first pair of transistors. The circuit is operable to produce a signal at the collectors of the first pair of transistors in response to the presence of a signal at either the augend connection or at the addend connection but not at both the augend and addend connections at the same time. The collectors of the first pair of transistors are connected to one of the emitter-base connections of the second pair of transistors and a carry information connection is connected to the other emitter-base connection of the second pair of transistors. The circuit is operable to produce a signal at the collectors of the second pair of transistors in response to the presence of a signal at either the carry information connection or at the collectors of the first pair of transistors but not at both the carry information connection and the collectors of the first pair of transistors at the same time. Thus, an output signal is produced at the collectors of the second pair of transistors in response to the presence of signals at all three of the connections or at any one of the connections, but not in response to signals at any two of the three connections or at none of the connections.

Figure 2:
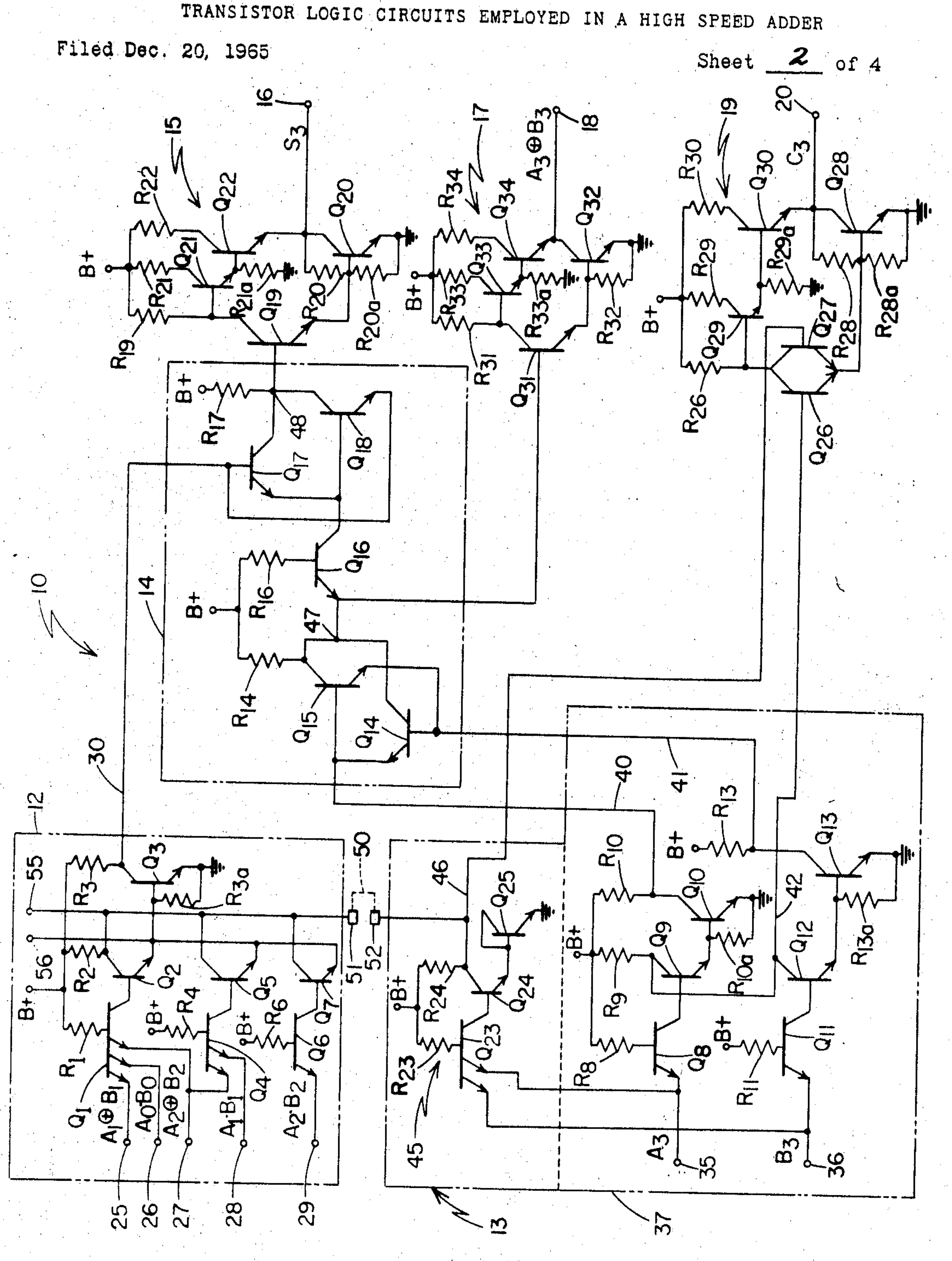
Figure 3:
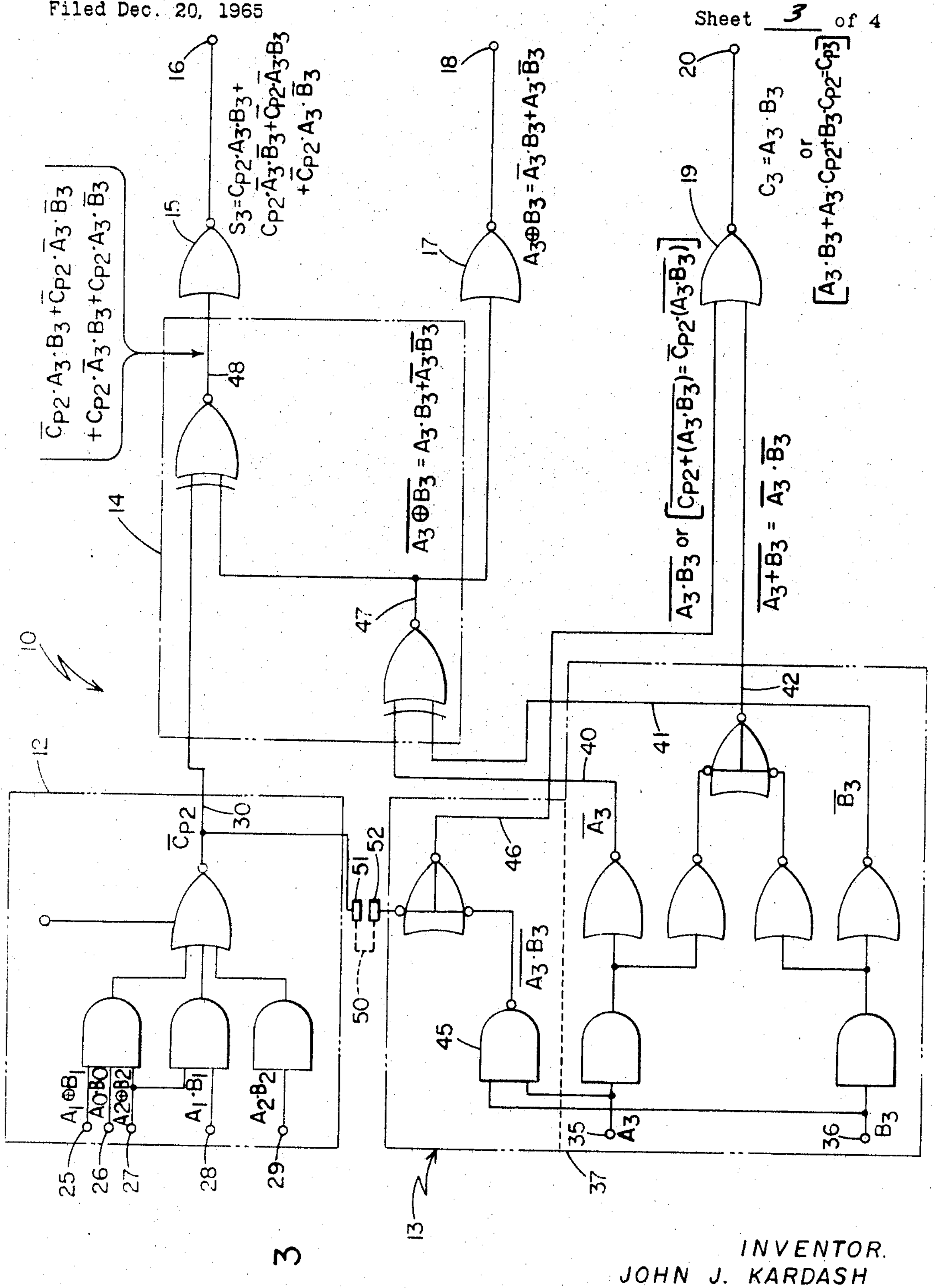
Figure 4:
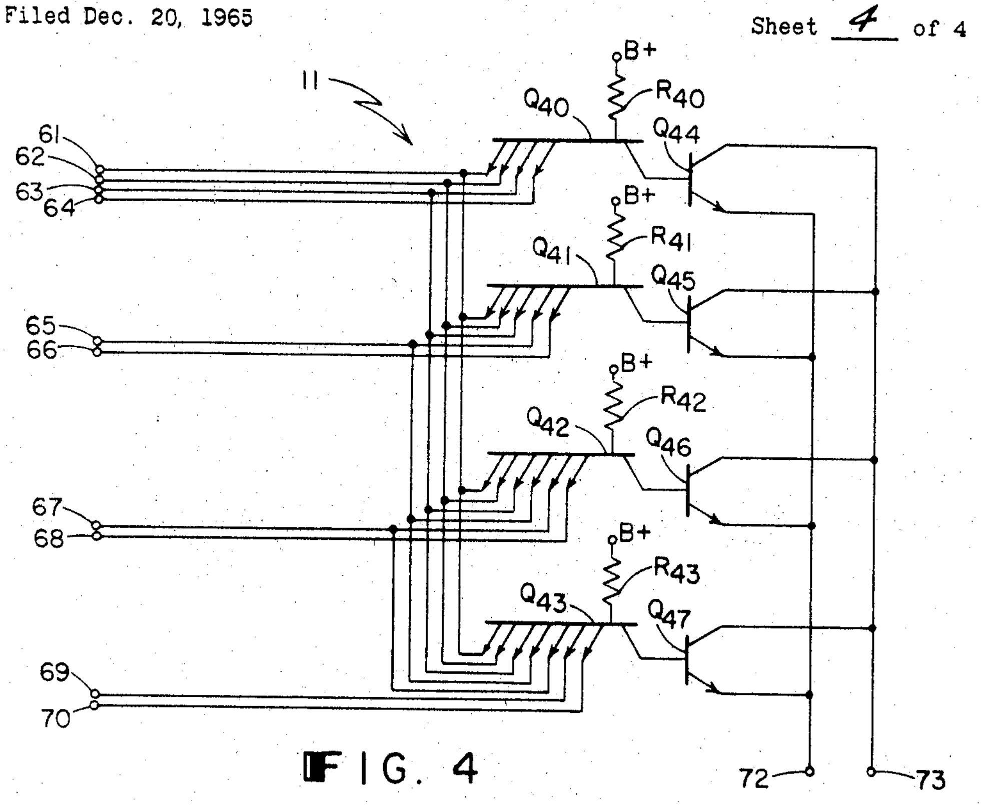
Figure 5:
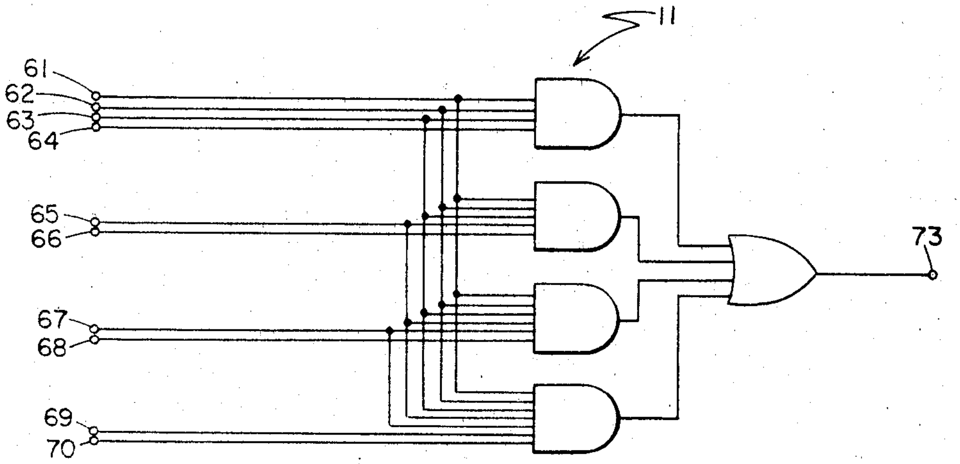

Additional objects, features, and advantages of the circuit according to the invention will be apparent from the following detailed discussion and the accompanying drawings wherein:

FIG. 1 is a block diagram of an eight stage parallel binary fast adder employing the circuits of the invention, FIG. 2 is a circuit diagram of one of the full adder stages of the fast adder of FIG. 1, FIG. 3 is a logic diagram of the full adder circuit of FIG. 2, FIG. 4 is a circuit diagram of a carry information decoder which is employed with the adder circuit of FIG. 2 in the higher order stages of the adder of FIG. 1, and FIG. 5 is a logic diagram of the decoder circuit of FIG. 4.

Fast adder of FIG. 1

FIG. 1 is a block diagram of an eight stage fast adder with look ahead carry in accordance with the invention. Each stage 10 is adapted to receive an augend bit $A_N$ and an addend bit $B_N$ and also carry information bits from all the preceeding stages. Each adder stage produces a sum $S_N$ and also carry information for succeeding stages of higher order. In the adder shown the carry information produced at each stage $N=0$ through $N=6$ depends only upon the augend and addend signals. Thus, the adder is "fast adder" since it is not necessary to propagate the carry information from stage to stage.

Each adder stage employs the augend signal, the addend signal, and the previous-carry information to produce a sum bit in accordance with the following expression for any stage N:

$$S_N=A_N\cdot\bar{B}_N\cdot\bar{C}_{PN-1}+\bar{A}_N\cdot B_N\cdot\bar{C}_{PN-1}+\bar{A}_N\cdot\bar{B}_N\cdot C_{PN-1}+A_N\cdot B_N\cdot C_{PN-1}$$

This signal is applied to the sum register of the arithmetic unit.

In addition to the sum signal each adder stage produces two carry information signals which depend only on the augend and addend signals applied to that stage. One is the direct or independent carry function which for any stage N is expressed logically as $A_N\cdot B_N$. The other is the exclusive-OR function of the augend and addend signals which may be expressed as $$\bar{A}_N\cdot B_N+A_N\cdot\bar{B}_N$$

or in abbreviated form as $A_N\oplus B_N$. These two carry information signals are transmitted to each succeeding adder stage of higher order. In the carry information input section of any adder stage N these signals are employed to produce a previous-carry signals $C_{PN-1}$ according to the following expression:

$$C_{PN-1}=[A_{N-1}\cdot B_{N-1}]+[(A_{N-1}\oplus B_{N-1})(A_{N-2}\cdot B_{N-2})]+[(A_{N-1}\oplus B_{N-1})(A_{N-2}\oplus B_{N-2})(A_{N-3}\cdot B_{N-3})]+\ldots[(A_{N-1}\oplus B_{N-1})(A_{N-2}\oplus B_{N-2})(A_{N-3}\oplus B_{N-3})\ldots\ldots(A_1\oplus B_1)(A_0\cdot B_0)].$$

As is apparent from the block diagram of FIG. 1 the logic required to handle the carry input information becomes more complex at each succeeding stage of higher order. Because of the logic complexity, separate carry information decoder sections 11 are employed at the higher order stages in order to simplify the adder itself. In order that the logic arrangement not become unmanageable, at certain stages a dependent carry which is the net previous-carry through that stage is generated in place of the independent carry and the exclusive-OR signals. A single previous-carry signal consolidating all carry information through that stage is then transmitted to the succeeding stage. Although some delay is introduced into the arithmetic opeartion because of propagation delay through the stage, the logic arrangement for handling large multi-bit numbers may thus be held within reasonable bounds.

As illustrated in FIG. 1 by employing the adder according to the invention a dependent previous carry signal $C_7$ may be taken from the eighth stage ($N=7$). If numbers having sixteen bits, for example, are being added, two groups of adders as shown in FIG. 1 may be employed. The single previous-carry signal from the eighth stage of the first group would be introduced at the $C_{IN}$ connection of the first stage of the second group of adder stages.

ADDER STAGE OF FIG. 2

General description

The details of a full adder stage 10 according to the invention are shown in the circuit diagram of FIG. 2, and the logic operations performed by sections of the circuit are illustrated by the logic diagram of FIG. 3. For purposes of illustration the circuit is described as employed for the fourth stage ($N=3$) of the adder shown in FIG. 1. Since the circuit employs NPN transistors and operates from a positive voltage source labeled B+, logic chosen for purposes of discussion is positive logic in which the more positive of two predetermined voltage levels at the input and output terminals is designated the binary "1" and the less positive voltage level is designated the binary "0." At various points within the circuit the more positive of two voltage levels which can occur under particular conditions indicates the logical expression as shown in FIG. 3 is satisfied, and the less positive level indicates the inverse of the expression is satisfied. The last-mentioned voltage levels are relative to each other and are not necessarily the same as the predetermined high and low level voltages which designate a binary "1" or a binary "0" at the input and output terminals.

The full adder stage 10 shown in FIG. 2 includes a carry input section 12 for receiving all the carry information from lower order preceeding stages and providing a previous-carry signal, an augend and addend input section 13 for receiving the augend and addend bit information from the augend and addend registers, and a sum generator section 14 for receiving signals from the carry input section and the augend and addend input sections and producing a signal indicative of the sum of the augend, addend, and previous-carry information. The circuit also includes a sum output circuit 15 which produces a compatible high or low level voltage at the sum output terminal 16 in accordance with the logical expression for the sum as stated previously. An exclusive-OR output circuit 17 which is connected to the sum generator section produces a compatible high or low level voltage at an exclusive-OR output terminal 18 in accordance with the exclusive-OR logical expression noted previously. A carry output circuit 19 provides a compatible high or low level voltage at a carry output terminal 20. In accordance with the invention the signal at the carry output terminal 20 satisfies either the expression for the independent carry signal or the expression for the dependent previous-carry signal as will be explained hereinbelow.

Carry input section

The carry input section 12 for the fourth stage ($N=3$) of the adder receives carry information signals from the three preceeding stages of lower order. The information is applied at five inputs terminals; the $A_1 \oplus B_1$ signal at a first input terminal 25, the $A_0 \cdot B_0$ signal at a second input terminal 26, the $A_2 \oplus B_2$ signal at a third input terminal 27, the $A_1 \cdot B_1$ signal at a fourth input terminal 28, and the $A_2 \cdot B_2$ signal at a fifth input terminal 29. The presence of the compatible high voltage level at a terminal indicates that the particular expression is satisfied (a binary "1") and the presence of the compatible low voltage level indicates that the expression is not satisfied (a binary "0"). The input signals at these terminals are operated on by the logic of the carry input section to produce a signal at the section output line 30 indicative of the net previous-carry in accordance with the expression $$C_{P2} = [A_2 \cdot B_2] + [(A_2 \oplus B_2) A_1 \cdot B_1] + [(A_2 \oplus B_2)(A_1 \oplus B_1) A_0 \cdot B_0]$$

The three input terminals 25, 26, and 27 are connected directly to the emitters of an NPN first input transistor $Q_1$. The base of the transistor is connected through a resistance $R_1$ to a source of positive voltage B+. The collector of the transistor is connected to the base of an NPN transistor $Q_2$. The collector of this transistor is connected through a collector resistance $R_2$ to the positive voltage source B+ and its emitter is connected through a resistance $R_{3a}$ to ground. The emitter of transistor $Q_2$ is also connected to the base of output transistor $Q_3$. The collector of output transistor $Q_3$ is connected through a collector resistance $R_3$ to the positive voltage source B+ and its emitter is connected directly to ground. The output line 30 from the carry input section is connected directly to the collector of the output transistor $Q_3$.

The input transistor $Q_1$ performs an AND logic function in a known manner. When any one of the input signals applied to the emitters of the input transistor $Q_1$ is at the low voltage level, the voltage level at the collector is low and effectively no signal is transmitted through the transistor. Current flows from the source B+ through the base resistance $R_1$ and the base-emitter diodes of the transistor $Q_1$. The greatest voltage drop occurs across the resistance $R_1$, causing the voltage at the base of the input transistor $Q_1$ to be relatively low. Although the transistor $Q_1$ is operating in saturation, conduction in the collector circuit is slight and the voltage at the collector of the transistor remains low.

The arrangement of resistances $R_2$ and $R_{3a}$ connected in series with transistor $Q_2$ is such that when low voltage from the collector of the input transistor $Q_1$ is applied to the base of transistor $Q_2$, a small current flows through the transistor and the series connected resistances $R_2$ and $R_{3a}$. A fairly high voltage is thus established at the collector of transistor $Q_2$ and a low voltage is established at the emitter. Since the voltage produced at the emitter of transistor $Q_2$ is low, the output transistor $Q_3$ is biased in the non-conduction condition and the voltage at the output line 30 is high.

As is well understood in the art of semiconductor logic circuits, when the high level voltage signal is present at any less than all the emitters of the input transistor $Q_1$, no change occurs in the collector circuit. When all the emitters are at the high voltage level concurrently, current from the source B+ can no longer flow in the same manner because all the base-emitter diodes of the transistor $Q_1$ are reverse biased. As the flow of current is reduced the voltage at the base of the input transistor $Q_1$ rises thereby causing current flow in the collector circuit and increasing the voltage at the collector. The input transistor $Q_1$ thus performs and AND logic function.

The increased voltage at the collector of transistor $Q_1$ causes current flow in the base-emitter circuit of transistor $Q_2$ thereby greatly increasing current flow through that transistor. The increased current flow through transistor $Q_2$ and the series connected resistances $R_2$ and $R_{3a}$ lowers the voltage at its collector and raises the voltage at its emitter. The output transistor $Q_3$ is thereby biased to conduction establishing a low voltage level at the collector and at the connecting output line.

Input terminals 27 and 28 are connected directly to the emitters of a second input transistor $Q_4$. The collector of this transistor is connected to the base of transistor $Q_5$ which has its emitter connected directly to the emitter of transistor $Q_2$ and its collector connected directly to the collector of transistor $Q_2$. This combination operates in the same manner as does the combination of transistors $Q_1$ and $Q_2$. Input transistor $Q_4$ performs an AND logic function in that concurrent high level signals at both of the input terminals 27 and 28 causes an increase of the voltage at the collector of transistor $Q_4$. Current flows through transistor $Q_5$ and the series connected resistances $R_2$ and $R_{3a}$ biasing transistor $Q_3$ to conduction and causing a low voltage to occur at the carry input section output line 30.

The single emitter of a third input transistor $Q_6$ is similarly connected to an input terminal 29 and its collector is connected to the base of transistor $Q_7$. Transistor $Q_7$ is connected in parallel with transistors $Q_2$ and $Q_5$. The presence of a high voltage level at the input terminal 29 raises the voltage at the collector of transistor $Q_6$ causing conduction through transistors $Q_7$ and $Q_3$ and lowering the voltage at the output line 30.

Thus, there are three possible combinations of carry information signals from the three preceding adder stages of lower order which will actuate the carry input section to provide a previous-carry signal at the output line 30. Since a low level signal occurs at the output line 30 in response to high level input signals at the input terminals, the logical operations performed may be considered as AND functions in series with an inverting OR function as shown in FIG. 3. That is, the higher level voltage at the output line 30 indicates the inverse of the previous-carry and therefore is designated as $\overline{C}_{P2}$ in FIG. 3.

Augend and addend input section

At the augend and addend input section 13 the augend bit signal $A_3$ is applied to a first input terminal 35 and the addend bit signal $B_3$ is applied to a second input terminal 36. The augend input terminal 35 is connected directly to the emitter of an augend input transistor $Q_8$ in one portion 37 of the section which has its base connected through a resistance $R_8$ to the positive voltage source B+. The collector of the augend input transistor $Q_8$ is connected to the base of a transistor $Q_9$ which has its collector connected through a collector resistance $R_9$ to the voltage source B+. The emitter of transistor $Q_9$ is connected through a resistance $R_{10a}$ to ground. The emitter of transistor $Q_9$ is also connected directly to the base of an augend output transistor $Q_{10}$ which has its collector connected through a collector resistance $R_{10}$ to the voltage source B+ and its emitter connected directly to ground.

The addend input terminal 36 is similarly connected to the emitter of an addend input transistor $Q_{11}$ also in the one portion 37 of the section which has its collector connected to the positive voltage source B+ through a resistance $R_{11}$ and its collector connected to the base of a transistor $Q_{12}$. The collector of transistor $Q_{12}$ is connected directly to the collector of transistor $Q_9$, and its emitter is connected through a resistance $R_{13a}$ to ground and also directly to the base of an addend output transistor $Q_{13}$. The collector of the addend output transistor $Q_{13}$ is connected through a resistance $R_{13}$ to the voltage source B+ and its collector is connected directly to ground.

The augend and addend input circuits each operate in a manner similar to the input circuits of the carry input secton. When a low level voltage is present at the augend input terminal 35 a low level voltage exists at the collector of transistor $Q_8$ whereby only a small current flows through the intermediate transistor $Q_9$ and the series connected resistances $R_9$ and $R_{10a}$. Transistor $Q_{10}$ is thereby biased in the non-conduction condition and a high voltage is established at the collector of transistor $Q_{10}$. When a high voltage level signal is applied to the augend input terminal 35 the voltage at the collector of transistor $Q_8$ rises increasing conduction through transistor $Q_9$. Transistor $Q_{10}$ is biased to conduction decreasing the voltage at the collector of the intermediate transistor $Q_{10}$. Low and high level voltage signals at the addend input terminal 36 similarly cause high and low level voltages, respectively, to be present at the collector of transistor $Q_{13}$. The signals on the augend output line 40 and the addend output line 41 which are connected to the collectors of output transistors $Q_{10}$ and $Q_{13}$, respectively, therefore are expressed logically as $\overline{A}_3$ and $\overline{B}_3$, respectively, as shown in the logic diagram of FIG. 3.

As noted previously, the collectors of the intermediate transistors $Q_9$ and $Q_{12}$ are connected directly to each other and through resistance $R_9$ to the voltage source B+. The two collectors are also connected to an output line 42. By virtue of the common collector connection if current flow is caused to increase to either transistor $Q_9$ or transistor $Q_{12}$ by the presence of a high level voltage at either of the two input terminals 35 or 36, current flows through resistance $R_9$ thus lowering the voltage at the output line 42. As shown in FIG. 3, since a low level signal at either collector causes a low level signal at the output line 42, the signal at the output line may be expressed logically as $\overline{A_3+B_3}$ or the equivalent $\overline{A_3}\cdot\overline{B_3}$.

The augend and addend input section 13 also includes an inverting AND circuit 45 which produces a signal at its output lines 46 indicative of the presence of concurrent high level signals at the augend and addend input terminals 35 and 36. This circuit includes an AND input transistor $Q_{23}$ having two emitters, one connected directly to the augend input terminal 35 and the other connected directly to the addend input terminal 36. The base of the input transistor $Q_{23}$ is connected through a resistance $R_{23}$ to the voltage source B+ and its collector is connected directly to the base of transistor $Q_{24}$. The collector of transistor $Q_{24}$ is connected through a collector resistance $R_{24}$ to the voltage source B+. Its emitter is connected directly to the base of a transistor $Q_{25}$ which has its emitter connected directly to ground and its collector shorted to its base.

This circuit operates in a manner similar to the input circuits of the carry input section 12 and to the augend and addend input circuits. The presence of a low level voltage signal at either the augend input terminal 35 or the addend input terminal 36 causes the voltage at the collector of input transistor $Q_{23}$ to be low biasing transistor $Q_{24}$ so as to cause only slight conduction through the series circuit of resistance $R_{24}$, transistor $Q_{24}$, transistor $Q_{25}$.

When high voltage signals are applied concurrently to the augend and input terminals 35 and 36 the voltage at the collector of the AND transistor $Q_{23}$ increases thereby increasing conduction through transistor $Q_{24}$ and decreasing the voltage at the output line 46. As shown in FIG. 3 the logical expression for the signal at the output line 46 is expressed as $A_3 \cdot B_3$. Shortened transistor $Q_{25}$ serves as a forward biased diode and its impedance characteristics establish the threshold voltage which must be exceeded at the input terminals 35 and 36 to cause conduction in the collector circuit of the input transistor $Q_{23}$.

Sum generator section

As explained hereinabove the input sections of the full adder circuit according to the invention provide a previous-carry signal at the carry section output line 30 which may be expressed as $\overline{C}_{P2}$ and augend and addend signals at the augend and addend output lines 40 and 41 which may be expressed as $\overline{A}_3$ and $\overline{B}_3$, respectively. These three signals are employed by the sum generator section 14 to produce a signal which after inversion by the sum output circuit 15 occurs at the sum output terminal 16 and satisfies the expression $$S_3=C_{P2}\cdot A_3\cdot B_3+C_{P2}\cdot\overline{A}_3\cdot\overline{B}_3+\overline{C}_{F2}\cdot\overline{A}_3\cdot B_3+\overline{C}_{P2}\cdot A_3\cdot\overline{B}_3$$

That is, a binary "1" signal occurs at the sum output terminal 16 if any one or all three of the previous-carry, the augend, the addend signals are a binary "1".

The sum generator section 14 includes a first pair of NPN transistors $Q_{14}$ and $Q_{15}$ having their emitters and bases directly cross-connected. Their collectors are connected directly to each other and through a collector resistance $R_{14}$ to the positive voltage source B+. One emitter-base connection is connected directly to the augend output line 40 and the other emitter-base connection is connected directly to the addend output line 41.

When the voltage level at the augend and addend output lines 40 and 41 are the same, whether high or low, the emitter and base of each of the transistors $Q_{14}$ and $Q_{15}$ are at the same potential, and therefore both transistors are biased to the non-conduction condition. Since both transistors are in the non-conduction condition the voltage level at the collectors 47 is relatively high.

When the voltage level at the augend output line 40 is high and that at the addend output line is low, transistor $Q_{14}$ is biased to the non-conduction condition but transistor $Q_{15}$ is biased to conduction. Current flow in the collector circuit causes the voltage at the collectors 47 to decrease. Similarly, if the high voltage level is present at the addend input line 41 while that at the augend input line 40 is low, transistor $Q_{15}$ is biased to non-conduction and transistor $Q_{14}$ conducts decreasing the voltage at the collectors 47. Thus, as illustrated in the logic diagram of FIG. 3 the first pair of transistors $Q_{14}$ and $Q_{15}$ operate logically as an inverting exclusive-OR circuit and the signal at the collectors 47 may be expressed as $A_3\cdot B_3+\overline{A}_3\cdot\overline{B}_3$, or as $\overline{A_3 \oplus B_3}$.

The common collector connection 47 of transistor $Q_{14}$ and $Q_{15}$ is connected directly to the emitter of an NPN transistor $Q_{16}$ which has its base connected through a resistance $R_{16}$ to the voltage source B+. The emitter of transistor $Q_{16}$ is connected to ground through two transistors $Q_{31}$ and $Q_{32}$ in the exclusive-OR output circuit 17. Transistor $Q_{16}$ operates in a manner similar to the input transistors discussed previously in that the voltage at the collector generally follows the voltage at the emitter. Thus, a relatively high level signal is present at the collector of transistor $Q_{16}$ when the voltage at the collectors of transistors $Q_{14}$ and $Q_{15}$ is relatively high, and a relatively low level signal is present at the collector of transistor $Q_{16}$ when the voltage at the collectors of transistors $Q_{14}$ and $Q_{15}$ is relatively low.

When the voltage at the common collector-emitter connection 47 tends to be relatively high by virtue of both transistors $Q_{14}$ and $Q_{15}$ being biased in the non-conduction condition, current flows from the source B+ through resistance $R_{14}$ and the forward biased base-emitter junctions of transistors $Q_{31}$ and $Q_{32}$. The relatively high voltage at the common collector-emitter connection 47 is thereby limited by the voltage drop across the base-emitter junctions of the transistors $Q_{31}$ and $Q_{32}$. Transistor $Q_{16}$ prevents transistors $Q_{31}$ and $Q_{32}$ from pulling any significant current from succeeding portions of the circuit, causing all of the current flow into the base of transistor $Q_{31}$ to pass through resistance $R_{14}$. Transistor $Q_{16}$ thus serves to isolate the succeeding portions of the circuit from the exclusive-OR output circuit 17 while transmitting the voltage level at the common collector connection 47 of transistors $Q_{14}$ and $Q_{15}$ to the succeeding portions of the circuit.

The sum generator section 14 includes a second pair of transistors $Q_{17}$ and $Q_{18}$. These transistors have their emitters and bases directly cross-connected and their collectors connected directly to each other similar to the first pair of transistors $Q_{14}$ and $Q_{15}$. The collector of transistor $Q_{16}$ is connected directly to one of the emitter-base cross-connections, and the carry section output line 30 is connected directly to the other emitter-base cross-connection. The common collector connection 48 is connected through a collector resistance $R_{17}$ to the voltage source B+ and also to the base of transistor $Q_{19}$ in the sum output circuit 15.

When the voltage at the collector of transistor $Q_{16}$ is at the relatively higher level by virtue of both transistors $Q_{14}$ and $Q_{15}$ being non-conducting and a relatively high voltage is present at the carry section output line 30 by virtue of transistor $Q_3$ being non-conducting, current flows from the voltage source B+ through resistance $R_3$, the base-collector junction of transistor $Q_{17}$, and the series connected base-emitter junctions of transistors $Q_{19}$ and $Q_{20}$ in the sum output circuit. The level of the voltage at the collector of transistor $Q_{16}$ is limited as explained previously and the voltage at the carry section output line 30 as established by current flow from the voltage source B+ through resistance $R_3$ and the forward biased junctions of transistors $Q_{17}$, $Q_{19}$, and $Q_{20}$ becomes only sufficiently greater than that at the collector of transistor $Q_{16}$ so as to forward bias the base-collector junction of transistor $Q_{17}$. Current flows through the base-collector junction of transistor $Q_{17}$ rather than through the base-emitter junction because the base-collector junction together with the forward biased base-emitter junctions of transistors $Q_{19}$ and $Q_{20}$ offers the lower potential path to ground. Under the foregoing conditions the voltage at the common collector connection of transistors $Q_{17}$ and $Q_{18}$ may be considered as at a relatively high level.

When the voltage levels at both the carry section output line 30 and the collector of transistor $Q_{16}$ are low, both transistors $Q_{17}$ and $Q_{18}$ are biased to the non-conduction condition. Thus, the voltage at their common collector connection is relatively high under these conditions also.

When the voltage level at either the carry section output line 30 or the collector of transistor $Q_{16}$ is relatively high and the voltage at the other is relatively low, either transistor $Q_{17}$ or $Q_{18}$ is biased to conduction. Resulting current flow in the collector circuit through the resistance $R_{17}$ decreases the voltage at the common-collector connection to a relatively low level. The second pair of transistors in the sum generator section thus functions logically as in inverting exclusive-OR circuit as illustrated in the logic diagram of FIG. 3 and the output signal at the common collector connection satisfying the expression $$\overline{C}_{P2}\cdot A_3\cdot B_3+\overline{C}_{P2}\cdot\overline{A}_3\cdot\overline{B}_3+C_{P2}\cdot\overline{A}_3\cdot B_3+C_{P2}\cdot A_3\cdot\overline{B}_3$$

Sum output circuit

The common collector connection of the second pair of transistors $Q_{17}$ and $Q_{18}$ is connected to a sum output circuit 15 which provides the inverse of the signal at the common connection at the sum output terminal 16. The operation of this circuit together with its features and advantages is described in application Ser. No. 281,183, filed May 17, 1963, by Richard E. Bohn and Richard C. Sirrine entitled, "Transistor Logic Circuits," and assigned to the assignee of the present invention.

As noted previously the common collector connection of transistors $Q_{17}$ and $Q_{18}$ is connected directly to the base of NPN transistor $Q_{19}$. The collector of this transistor is connected through a collector resistance $R_{19}$ to the positive voltage source B+ and its emitter is connected through resistance $R_{20a}$ to ground. The base of output transistor $Q_{20}$ is connected directly to the emitter of transistor $Q_{19}$, its emitter is connected directly to ground, and its collector is connected directly to the sum output terminal 16. A resistance $R_{20}$ is connected between the collector and base of transistor $Q_{20}$.

The base of another NPN transistor $Q_{21}$ is connected directly to the collector of transistor $Q_{19}$. Its collector is connected to the positive voltage source B+ through a resistance $R_{21}$ and its emitter is connected to ground through a resistance $R_{21a}$. An NPN voltage setting transistor $Q_{22}$ has its base connected directly to the emitter of transistor $Q_{21}$, its collector connected through a resistance $R_{22}$ to the positive voltage source B+, and its emitter connected directly to the sum output terminal 16.

The arrangement of resistances $R_{19}$ and $R_{20a}$ connected in series with transistor $Q_{19}$ together with biasing resistance $R_{20}$ connected to the output terminal is such that when either transistor $Q_{17}$ or $Q_{18}$ is biased to conduction producing a low voltage at the base of transistor $Q_{19}$, transistor $Q_{19}$ is biased so that only a small current flows through transistor $Q_{19}$ and the series connected resistances $R_{19}$ and $R_{20a}$. A fairly high voltage is thus established at the collector of transistor $Q_{19}$ and a fairly low voltage is established at the emitter. Since the voltage produced at the emitter of the transistor $Q_{19}$ is low, the output transistor $Q_{20}$ is biased in the non-conduction condition. In this condition the transistor presents a high impedance between the sum output terminal 16 and ground.

The fairly high voltage at the collector of transistor $Q_{19}$ is applied to the base of transistor $Q_{21}$. However, since emitter resistance $R_{21a}$ is large relative to resistance $R_{19}$, transistor $Q_{21}$ is not biased to conduction. A small leakage current does flow through resistance $R_{21}$, transistor $Q_{21}$, and also through transistor $Q_{22}$, although both transistors can be considered as being substantially non-conductive. The voltage drop across the forward resistances of the base-emitter junctions of transistors $Q_{21}$ and $Q_{22}$ establishes the predetermined high voltage level at the sum output terminal 16.

As explained previously when a high voltage level signal occurs at the collectors of the second pair of transistors $Q_{17}$ and $Q_{18}$, increased current flows through transistor $Q_{19}$. Current flows through the series connected resistances $R_{19}$ and $R_{20a}$ lowering the voltage at the collector of transistor $Q_{19}$ and raising the voltage at the emitter. The output transistor $Q_{20}$ is biased to conduction providing a low impedance path between the sum output terminal 16 and ground and establishing the predetermined low voltage level at the sum output terminal.

The voltage at the base of transistor $Q_{21}$ is decreased, thus insuring that this transistor and consequently transistor $Q_{22}$ remain in substantially non-conducting condition maintaining the sum output terminal 16 at the low voltage signal level.

Upon termination of current flow through the base of transistor $Q_{19}$ by virtue of the low level signal occurring at the common collector connection of transistor $Q_{17}$ and $Q_{18}$, conduction in transistor $Q_{19}$ and the series connected resistances $R_{19}$ and $R_{20a}$ is reduced. The voltage at the collector of transistor $Q_{19}$ is thereby increased and that at the emitter is reduced.

The reduced voltage at the emitter of transistor $Q_{19}$ biases the base of the output transistor $Q_{20}$ so as to render that transistor substantially non-conducting. The output transistor $Q_{20}$ thus presents a high impedance between the sum output terminal 16 and ground. The increased voltage at the base of transistor $Q_{21}$ together with the low bias voltage existing at its emitter by virtue of the low voltage level at the sum output terminal 16 causes transistors $Q_{21}$ and $Q_{22}$ to conduct. These transistors conduct heavily until the voltage at the sum output terminal 16 is restored to the predetermined high level established by the voltage of the source B+ less the leakage current voltage drop across resistance $R_{19}$ and the base-emitter junctions of transistors $Q_{21}$ and $Q_{22}$.

The voltage at the sum output terminal 16 may not revert to the high level immediately upon termination of current flow through the output transistor $Q_{20}$ because of various capacitance effects on the sum output terminal 16 and its external connections. In order for the voltage at the sum output terminal to rise, this load capacitance must be charged. The heavy flow of current from the voltage source B+ through the voltage setting transistors $Q_{21}$ and $Q_{22}$ charges the load capacitance very rapidly. When the voltage at the sum output terminal reaches the predetermined high level as established by the leakage current through the resistance $R_{19}$ and the resistances of the base-emitter junctions of the transistors, the transistors are no longer in conduction condition.

Thus, the sum output circuit 15 operates logically as an inverter, and as shown in the logic diagram of FIG. 3 the signal at the sum output terminal may be expressed as $$S_3 = C_{P2} \cdot A_3 \cdot B_3 + C_{P2} \cdot \overline{A}_3 \cdot \overline{B}_3 + \overline{C}_{P2} \cdot A_3 \cdot B_3 + \overline{C}_{P2} \cdot A_3 \cdot \overline{B}_3$$

Carry output circuit—Independent carry

The output lines 42 and 46 from the augend and addend input section 13 are connected to a carry output circuit 19. The output line 42 from the common collector connection which may be designated the OR output line is connected directly to the base of a first transistor $Q_{26}$. The other output line 46 which may be designated the AND output line is connected directly to the base of a second transistor $Q_{27}$. The collectors of transistors $Q_{26}$ and $Q_{27}$ are directly connected to each other and through a collector resistance $R_{26}$ to the voltage source B+. Their emitters are also directly connected to each other and are connected to ground through a resistance $R_{28a}$.

The parallel arrangement of transistors $Q_{26}$ and $Q_{27}$ and their series connected resistances provide an inverse OR function. That is, when the signals on both of the lines 42 and 46 are at low voltage levels, both transistors $Q_{26}$ and $Q_{27}$ are in a low conduction condition. Thus, the voltage at the common collector connection is at a high level and that at the common emitter connection is at a low level. When a high level signal occurs at either the OR output line 42 or the AND output line 46, either transistor $Q_{26}$ or $Q_{27}$ becomes highly conductive causing the voltage at the collectors to decrease and that at the emitters to increase.

The common emitter connection of transistors $Q_{26}$ and $Q_{27}$ is connected to an output transistor $Q_{28}$ and the common collector connection is connected to a transistor $Q_{29}$. These transistors and a voltage setting transistor $Q_{30}$ are arranged in a manner similar to the sum output circuit 15. Thus, the carry output circuit 19 operates similar to the sum output circuit 15 to produce the predetermined high voltage level at the carry output terminal 20 when conduction through both transistors $Q_{26}$ and $Q_{27}$ is low and to produce the predetermined low voltage level at the carry output terminal when conduction through either transistor $Q_{26}$ or $Q_{27}$ is high.

The carry output circuit 19 thus operates to provide an inverse OR function. That is, a high level signal at either the OR output line 42 or the AND output line 46 produces a low level signal at the carry output terminal 20, and coincident low level signals at the OR and AND output lines are required to produce a high level signal at the carry output terminal 20. As shown in the logic diagram of FIG. 3 the signal at the carry output terminal 20 may be expressed logically as the independent carry function $C_3 = A_3 \cdot B_3$. Although this logic expression could obviously be derived with a much less complex logic network, this arangement may be employed together with the carry input section 12 in a manner to be explained hereinafter so as to provide a dependent or previous-carry signal.

Carry output circuit—Dependent carry

The adder circuit of FIG. 2 may be employed to provide a dependent or previous-carry signal rather than an independent carry signal by a direct connection 50 between terminals 51 and 52. The collector of transistor $Q_{24}$ is thereby connected directly to transistors $Q_2$, $Q_5$, and $Q_7$ of the carry input section 12. This connection places these transistors in parallel providing a direct OR connection of the signal at the common collector connection of transistors $Q_2$, $Q_5$, and $Q_7$ and the signal at the collector of transistor $Q_{24}$ whereby a low voltage signal at a collector of any of the transistors causes a low voltage signal to be present at the AND output line 46.

As explained previously the signal generated in the carry input section 12 and appearing at the collectors of transistors $Q_2$, $Q_5$, and $Q_7$ may be expressed logically as $\overline{C}_{P2}$, and the signal generated in the AND portion of the augend and addend input section and appearing at the collector of transistor $Q_{24}$ may be expressed as $\overline{A_3 \cdot B_3}$. With terminal 51 shorted to terminal 52 the logical expression for the signal at the AND output line 46 is $\overline{C_{P2} + (A_3 B_3)}$ or its equivalent $\overline{C}_{P2} \cdot \overline{(A_3 \cdot B_3)}$ as shown in brackets in the logic diagram of FIG. 3. The signal at the AND output line 46 and the signal at the OR output line 42 are operated on by the carry output circuit 19 which performs an inverse OR function. The signal at the carry output terminal 20 may be expressed logically as $$C_3 = A_3 \cdot B_3 + A_3 \cdot C_{P2} + B_3 \cdot C_{P2}, \text{ or } C_3 = C_{P3}$$

the net previous-carry signal through the $N=3$ stage. The previous-carry expression consolidates all carry information through the stage in which it is generated. Thus, the next stage requires only a single carry information input rather than a logical array of the carry input section as shown in FIG. 2.

Exclusive-OR output circuit

The carry input section of each stage of the fast carry adder according to the invention employs the exclusive-OR expression of previous sets of augend and addend bits. In the added circuit of FIG. 2 this signal is provided at an output terminal 18 of an output circuit 17 which is connected to the common collector connection of the first pair of transistors $Q_{14}$ and $Q_{15}$ of the sum generator section 14.

The exclusive-OR output circuit 17 includes a transistor $Q_{31}$, and output transistor $Q_{32}$, and transistors $Q_{33}$ and $Q_{34}$ all arranged similarly to the corresponding transistors in the sum and carry output circuits 15 and 19, respectively. The exclusive-OR output circuit 17 performs an inverting operation on the signal at the collectors of transistors $Q_{14}$ and $Q_{15}$. Thus, the signal at the exclusive-OR output terminal may be expressed as $A_3 \oplus B_3$ which is also $\overline{A}_3 \cdot B_3 + A_3 \cdot \overline{B}_3$.

The exclusive-OR output circuit 17 operates generally similar to the sum and carry output circuits 15 and 19. The voltage levels of the signals at the collectors of transistors $Q_{14}$ and $Q_{15}$ as limited by transistor $Q_{16}$ are such that a biasing resistance such as $R_{20}$ and $R_{28}$ is not needed to provide proper biasing conditions for transistor $Q_{31}$. The exclusive-OR output circuit 17 otherwise operates similarly to the other two output circuits. A low level signal at the base of transistor $Q_{31}$ causes only slight conduction through that transistor biasing the output transistor $Q_{32}$ to nonconduction and permitting the predetermined high voltage level to be maintained at the exclusive-OR output terminal 18. A relatively high level signal at the base of transistor $Q_{31}$ causes heavy conduction through that transistor and output transistor $Q_{32}$ and establishes the relatively low voltage level at the exclusive-OR output terminal 18.

Carry information decoding circuit of FIG. 4

As shown in the block diagram of FIG 1 the circuit of FIG. 2 may be employed to provide each of the first four stages ($N=0$ through $N=3$) of an adder by appropriate input connections to the carry input section 12. However, in order for the circuit to serve as higher order stages in a fast carry adder, additional logic must be provided in order to process all the necessary carry information from the previous stages of lower order. Rather than unduly complicate the circuit arrangement illustrated in FIG. 2, which as shown is readily fabricated as a monolithic integrated circuit network in a single piece of semiconductor material, additional logic is provided separately and applied to the carry input section 12 at terminals 55 and 56.

A compatible carry information decoding circuit 11 for augmenting the logic of the carry input section of FIG. 2 is illustrated in FIG. 4 and its logic diagram is shown in FIG. 5. The circuit of FIG. 4 includes a plurality of multiple emitter transistors $Q_{40}$, $Q_{41}$, $Q_{42}$, and $Q_{43}$ each emitter being connected to an input terminal 61 through 70. The base of each transistor is connected through a resistance to the voltage source B+, and each collector is connected to the base of another transistor $Q_{44}$, $Q_{45}$, $Q_{46}$, and $Q_{47}$, respectively. The emitters of these transistors are connected directly to each other and to a terminal 72. The collectors of transistors $Q_{44}$, $Q_{45}$, $Q_{46}$, and $Q_{47}$ are also connected directly to each other and to a terminal 73.

The terminals 72 and 73 are connected directly to terminals 56 and 55, respectively, of the circuit of FIG. 2 in order to provide any one of the higher order ($N=4$ through $N=7$) full adder stages of the adder illustrated in FIG. 1. The emitters and collectors of transistors $Q_{44}$, $Q_{45}$, $Q_{46}$, and $Q_{47}$ are thus connected directly to the emitters and collectors of the transistors $Q_2$, $Q_5$, and $Q_7$ of the carry input section 12. Transistors $Q_{40}$, $Q_{41}$, $Q_{42}$, and $Q_{43}$ each act as an AND transistor as do transistors $Q_1$, $Q_4$, and $Q_6$, causing increased conduction through the appropriate transistors $Q_{44}$, $Q_{45}$, $Q_{46}$ $Q_{47}$ upon the concurrent occurrence of a high voltage level at all the emitters of one of the input transistors. Conduction through any one of transistors $Q_{44}$, $Q_{45}$, $Q_{46}$, or $Q_{47}$ causes conduction through transistor $Q_3$ thereby producing a low voltage level at the carry section output line 30. Thus, when appropriate connections of the carry information at the carry and exclusive-OR output terminals 20 and 18 of preceeding stages are properly made to the input terminals 25 through 29 of the carry input section 12 of FIG. 2 and the input terminals 61 through 70 of the carry information decoder circuit 11 of FIG. 4, all the logic functions are provided for generating a signal indicative of the previous-carry signal $C_{PN-1}$ for any of the stages $N=4$ through $N=7$ of the adder of FIG. 1.

Fast adder of FIG. 1—Summary

FIG. 1 illustrates in block diagram form an eight stage fast adder with look ahead carry employing the circuitry of the invention. Each of the first four stages ($N=0$ through $N=3$) employs only the adder circuit of FIG. 2 with the input terminals of the carry input section connected to appropriate carry information output terminals of the preceding stages. Each of the last four stages ($N=4$ through $N=7$) employs the adder circuit 10 of FIG. 2 with the carry input section augmented by the carry information decoder circuit 11 of FIG. 4. In each of the first seven stages ($N=0$ through $N=6$) terminal 51 of the adder circuit of FIG. 2 is not connected to terminal 52 whereby the output signal at the carry output terminal 20 is an independent carry expressed logically as $A_N \cdot B_N$. In the highest order stage ($N=7$) terminal 51 is shorted to terminal 52 whereby the signal at the carry output terminal is the net previous-carry signal $C_{P7}$.

If the adder is employed in adding numbers having more than eight bits, for example sixteen bits, the carry output terminal 20 of the eighth stage is connected to the input terminal 29 of the single emitter input transistor $Q_6$ in the carry input section of the ninth stage. Since all the carry information from preceding stages is consolidated in the previous carry signal $C_{P7}$, no other connections from preceeding stages are made to the ninth stage.

The look ahead fast adder of FIG. 1 could be modified to a relatively simple but slower serial type adder in which carry information is propagated from stage to stage by employing for each stage the adder circuit of FIG. 2 with terminal 51 connected to terminal 52. The only connection between stages would be from the carry output terminal 20 of each stage to the input terminal 29 of the single emitter input transistor $Q_6$ of the next succeeding stage of higher order. The exclusive-OR function would not be used.

Conclusion

The adder according to the invention provides various features and advantages over previously known circuits. Signals generated within the carry input section 12 are compatible with signals generated in the augend and addend input section 13. The adder circuit of the invention permits these signals to be utilized to produce the independent carry information required in a look ahead fast carry type of adder. The adder circuit also permits these signals to be utilized to consolidate independent carry information and produce a dependent previous-carry signal. The carry input section may be augmented with additional logic as needed by simple paralleling of compatible logic elements of the carry information decoder section.

The sum generator section 14 of the adder is a logically simple arrangement of two inverse exclusive-OR functions. The circuitry for performing these functions includes two pairs of cross-coupled transistors connected through a buffer transistor. Since the first pair of transistors in the sum generator section 14 operate on signals indicative of the augend and addend input signals, a signal indicative of the exclusive-OR expression for the augend and addend signals is available within the sum generator without the need for separate logic. This signal is then processed in an output circuit 17 which produces the exclusive-OR expression $A_N \oplus B_N$ at its output terminal 18.

By generating and utilizing the exclusive-OR expression $A_N \oplus B_N$, or $\overline{A}_N \cdot B_N + A_N \cdot \overline{B}_N$, rather than the simpler inclusive-OR expression $A_N + B_N$ unnecessary redundancy in the carry information provided to each adder stage is avoided. At each stage of the adder only one group of terms of the expression for the previous-carry signal $C_{PN-1}$ can be satisfied since the exclusive-OR expression and the AND expression from each one of the preceding stages are mutually exclusive. (Each group of terms is enclosed by brackets in the expression for $C_{PN-1}$ on col. 4.) Thus, at any one stage no more than one of the input transistors $Q_1$, $Q_4$, or $Q_6$ shown in FIG. 2, or transistors $Q_{40}$, $Q_{41}$, $Q_{42}$, or $Q_{43}$ of supplemental decoder circuit shown in FIG. 4 together with its associated transistor $Q_2$, $Q_5$, $Q_7$, $Q_{44}$, $Q_{45}$, $Q_{46}$, or $Q_{47}$, respectively, can be conducting heavily at one time. Therefore, any change in data presented to the adder, regardless of the information already present, requires changes of operating conditions in a minimum of components. Consequently, the changes can be accomplished with a minimum of driving power and delay.

The augend and addend input section 13 of the adder circuit of FIG. 2 includes a simple transistor circuit 37 for performing certain logic operations. Independent signals indicative of the bit at the augend and addend input terminals 35 and 36 are produced at separate output lines 40 and 41, respectively. In addition, a signal indicative of the OR function of the augend and addend bits is produced at a third output line 42.

The sum, exclusive-OR, and carry output circuits 15, 17, and 19 provide high level and low level voltages designating the binary "1" and binary "0," respectively, which are compatible with each other and with the requirements for input signals to the input terminals of both the augend and addend input section 37 and the carry input section 12. The output circuits also provide other desirable features as discussed in the aforementioned application of Bohn and Sirrine.

The circuits of the invention are particularly amenable to fabrication as monolithic integrated circuit networks. Only transistors and resistances are employed as components of the circuits, and these components may be readily produced within a body of semiconductor material by known diffusion processes. Since the circuit of FIG. 2 is basically the same for each stage, quantity production of identical circuits by batch processing is economical. Each circuit can be employed to generate a dependent or an independent carry merely by the presence or absence of a connection 50 between terminals 51 and 52. The basic circuit is readily expanded for use as higher order stages by the simple parallel connection of the compatible decoder circuit of FIG. 4, which circuit is also amenable to economical production in quantity as a monolithic integrated circuit network.

Although for ease of understanding and consistent terminology the use of the circuitry of the invention as an adder has been discussed, other uses are obvious. It is common practice in the arithmetic unit of a digital computer to perform subtraction by taking the complement of the numbers and adding. Therefore, the circuitry of the invention may readily be employed for subtraction regardless of the fact that the terminology of the addition process is employed throughout this application. It is also contemplated that portions of the circuitry disclosed may find uses in sectors of the electronic data processing art other than addition and subtraction.

While there has been shown and described what is considered a preferred embodiment of the present invention, it will be obvious to those skilled in the art that various changes and modifications may be made therein without departing from the invention as defined in the appended claims.

What is claimed is:

1. A full adder circuit including in combination a carry information circuit means having a carry information output connection, said carry information circuit means being operable in response to input signals applied thereto to produce a signal indicative of carry information at the carry information output connection;

an augend input terminal;

an addend input terminal;

an augend input circuit means having an augend output connection, said augend input circuit means being connected to the augend input terminal and being operable to produce a signal at the augend output connection in response to a signal at the augent input terminal;

an addend input circuit means having an addend output connection, said addend input circuit means being connected to the addend input terminal and being operable to produce a signal at the addend output connection in response to a signal at the addend input terminal;

a sum output terminal;

sum generator means connected to the carry information output connection, the augend output connection, the addend output connection, and the sum output terminal, and operable to produce a signal at the sum output terminal indicative of the sum of the signals at the carry information circuit means, the augend input terminal, and the addend input terminal;

an AND circuit means having an AND connection, said AND circuit means being connected to the augend and to the addend input terminals and being operable to produce a signal at the AND connection in response to coincident signals at the augend and addend input terminals;

an OR circuit means having an OR connection, said OR circuit means being connected to the augend and to the addend input terminals and being operable to produce a signal at the OR connection in response to a signal at either the augend or the addend input terminal;

means for providing a connection between the carry information output connection and the AND connection to provide a signal at the AND connection when a signal is produced at the carry information output connection; and a carry output circuit means having a carry output terminal, said carry output circuit means being connected to the OR connection and to the AND connection and being operable to produce a signal at the carry output terminal in response to coincident signals at the AND and OR connections.

2. A full adder circuit including in combination a carry information input circuit means having input connections thereto and a carry information output connection, said carry information input circuit means being operable in response to the presence of input signals at particular input connections to produce a signal indicative of a previous carry at the carry information output connection;

an augend input terminal;

an addend input terminal;

an augend input circuit means having an augend output connection, said augend input circuit means being connected to the augend input terminal and being operable to produce a signal at the augend output connection in response to a signal at the augend input terminal;

an addend input circuit means having an addend output connection, said addend input circuit means being connected to the addend input terminal and being operable to produce a signal at the addend output connection in response to a signal at the addend input terminal;

a first exclusive-OR circuit means having an exclusive-OR connection, said first exclusive-OR circuit means being connected to the augend output connection and to the addend output connection and being operable to produce a signal at the exclusive-OR connection in response to the presence of a signal at either the augend or the addend output connection but not at both the augend and the addend output connections;

an output circuit means having an exclusive-OR output terminal, said output circuit means being connected to the exclusive-OR connection and being operable to produce a signal at the exclusive-OR output terminal in response to the presence of a signal at the exclusive-OR connection, said signal at the exclusive-OR output terminal indicating the presence of a signal at either the augend input terminal or at the addend input terminal but not at both the augend and addend input terminals;

a sum output terminal;

a second exclusive-OR circuit means connected to the carry information output connection, the exclusive-OR connection, and the sum output terminal, and operable to produce a signal at the sum output terminal in response to the presence of a signal at either the carry information output connection or the exclusive-OR connection but not at both the carry information output connection and the exclusive-OR connection, said signal at the sum output terminal indicating the presence of signals at both the augend and addend input terminals together with a previous-carry signal from the carry information input circuit means, the presence of a signal at the augend input terminal but not at the addend input terminal and no previous-carry signal from the carry information input circuit means, the presence of a signal at the addend input terminal but not at the augend input terminal and no previous-carry signal from the carry information input circuit means, or the presence of a previous-carry signal from the carry information input circuit means but not at the augend input terminal nor at the addend input terminal;

an AND circuit means having an AND connection, said AND circuit means being connected to the augend and to the addend input terminals and being operable to produce a signal at the AND connection in response to coincident signals at the augend and addend input terminals;

an OR circuit means having an OR condition, said OR circuit means being connected to the augend and to the addend input terminals and being operable to produce a signal at the OR connection in response to a signal at either the augend or the addend input terminal;

means for providing a connection between the carry information output connection and the AND connection to provide a signal at the AND connection when a signal is produced at the carry information output connection; and a carry output circuit means having a carry output terminal, said carry output circuit means beings connected to the OR connection and to the AND connection and operable to produce a signal at the carry output terminal in response to coincident signals at the AND and OR connections, said signal at the carry output terminal indicating the presense of signals at both the augend and addend input connections or the presence of a previous-carry signal from the carry information input circuit means together with the presence of a signal at either the augend or the addend input terminal.

3. A sum generator circuit including in combination an augend connection;

an addend connection;

a carry information connection;

a first circuit means including a first pair of transistors;

the augend connection being connected to the emitter of one transistor and to the base of the other transistor of the first pair of transistors, the addend connection being connected to the emitter of the other transistor and to the base of the one transistor of the first pair of transistors, and the collectors of the transistors of the first pair of transistors being connected to each other;

said first circuit means being operable to produce a signal at the collectors of the first pair of transistors in response to the presence of a signal at either the augend connection or at the addend connection but not at both the augend and addend connections;

a second circuit means including a second pair of transistors;

means connecting the carry information connection to the emitter of one transistor and to the base of the other transistor of the second pair of transistors, means connecting the collectors of the first pair of transistors to the emitter of the other transistor and to the base of the one transistor of the second pair of transistors, and the collectors of the transistors of the second pair of transistors being connected to each other;

said second circuit means being operable to produce a signal at the collectors of the second pair of transistors in response to the presence of a signal at either the carry information connection or at the collectors of the first pair of transistors but not at both the carry information connection and the collectors of the first pair of transistors thereby indicating the presence of signals at the augend connection, the addend connection, and the carry information connection, the presence of a signal at the augend connection but not at the addend connection or at the carry information connection, the presence of a signal at the addend connection but not at the augend connection or at the carry information connection, or the presence of a signal at the carry information connection but not at the augend connection or at the addend connection.

4. A sum generator circuit including in combination an augend connection;

an addend connection;

a carry information connection;

a first circuit means including a first pair of transistors;

the augend connection being connected to the emitter of one transistor and to the base of the other transistor of the first pair of transistors, the addend connection being connected to the emitter of the other transistor and to the base of the one transistor of the first pair of transistors, and the collectors of the transistors of the first pair of transistors being connected to each other;

said first circuit means being operable to bias both transistors of the first pair of transistors to the non-conduction condition during the presence of signals of the same voltage level at the augend and addend connections, and operable to bias a transistor of the first pair of transistors to the conduction condition during the presence of signals of different voltage at the augend and addend connections;

a second circuit means including a second pair of transistors;

means connecting the carry information connection to the emitter of one transistor and to the base of the other transistor of the second pair of transistors, means connecting the collectors of the first pair of transistors to the emitter of the other transistor and to the base of the one transistor of the second pair of transistors, and the collectors of the transistors of the second pair of transistors being connected to each other;

said second circuit means being operable to bias both transistors of the second pair of transistors to the non-conduction condition during the presence of a first signal condition at the carry information connection when both transistors of the first pair of transistors are in the non-conduction condition, said second circuit means being operable to bias both transistors of the second pair of transistors to the non-conduciton condition during the presence of a second signal condition at the carry information connection when a transistor of the first pair of transistors is in the conduction condition, said second circuit means being operable to bias a transistor of the second pair of transistors to the conduction condition during the presence of the first signal condition at the carry information connection when a transistor of the first pair of transistors is in the conduction condition, and said second circuit means being operable to bias a transistor of the second pair of transistors to the conduction condition during the presence of the second signal condition at the carry information connection when both transistors of the first pair of transistors are in the non-conduction condition.

5. A sum generator circuit including in combination a first pair of transistors having the emitter of one transistor connected directly to the base of the other transistor, the emitter of the other transistor connected directly to the base of the one transistor, and the collectors of the transistors connected directly to each other;

means connecting the collectors of the transistors to a source of reference potential;

augend input means connected to the emitter of the one transistor and to the base of the other transistor;

addend input means connected to the emitter of the other transistor and to the base of the one transistor;

said augend input means and said addend input means being operable to produce a first signal condition at the emitter of the one transistor and the base of the other transistor and to produce the first signal condition at the emitter of the other transistor and the base of the one transistor biasing both transistors to the non-conduction condition, said augend input means and said addend input means being operable to produce a second signal condition at the emitter of the one transistor and at the base of the other transistor and to produce the second signal condition at the emitter of the other transistor and at the base of the one transistor biasing both transistors to the non-conduction condition, said augend input means and said addend input means being operable to produce the first signal condition at the emitter of the one transistor and at the base of the other transistor and to produce the second signal condition at the emitter of the other transistor and at the base of the one transistor biasing the one transistor to the conduction condition, and said augend input means and said addend input means being operable to produce the second signal condition at the emitter of the one transistor and at the base of the other transistor and to produce the first signal conditon at the emitter of the other transistor and at the base of the one transistor biasing the other transistor to the conduction condition;

a second pair of transistors having the emitter of one transistor connected directly to the base of the other transistor, the emitter of the other transistor connected directly to the base of the one transistor, and the collectors of the transistors connected directly to each other;

means connecting the collectors of the transistors of the second pair of transistors to the source of reference potential:

carry information input means connected to the emitter of the one transistor and to the base of the other transistor of the second pair of transistors;

said carry information input means being operable to produce a first signal condition at the emitter of the one transistor and at the base of the other transistor of the second pair of transistors, and being operable to produce a second signal condition at the emitter of the one transistor and at the base of the other transistor of the second pair of transistors;

coupling means connecting the collectors of the transistors of the first pair of transistors to the emitter of the other transistor and to the base of the one transistor of the second pair of transistors;

said coupling means being operable to bias both transistors of the second pair of transistors to the non-conduction condition during the presence of the second signal condition at the emitter of the one transistor and at the base of the other transistor when both transistors of the first pair of transistors are in the non-conduction condition, said coupling means being operable to bias both transistors of the second pair of transistors to the non-conduction condition during the presence of the first signal condition at the emitter of the one transistor and at the base of the other tarnsistor when a transistor of the first pair of transistors is in the conduction condition, said coupling means being operable to bias the one transistor of the second pair of transistors to the conduction condition during the presence of the first signal condition at the emitter of the one transistor and at the base of the other transistor when both transistors of the first pair of transistors are in the non-conduction condition, and said coupling means being operable to bias the other transistor of the second pair of transistors to the conduction condition during the presence of the second signal condition at the emitter of the one transistor and at the base of the other transistor when a transistor of the first pair of transistors is in the conduction condition.

6. A sum generator circuit according to claim 5 including a sum output circuit means connected to the collectors of the second pair of transistors and having a sum output terminal;

said sum output circuit means being operable to produce a first signal condition at said sum output terminal when both transistors of the second pair of transistors are in the non-conduction condition, and being operable to produce a second signal condition at said sum output terminal when a transistor of the second pair of transistors is in the conduction condition; and an exclusive-OR output circuit means connected to the collector of the first pair of transistors and having an exclusive-OR output terminal;

said exclusive-OR output circuit means being operable to produce a first signal condition at said exclusive-OR output terminal when both transistors of the first pair of transistors are in the non-conduction condition, and being operable to produce a second signal condition at said exclusive-OR output terminal when a transistor of the first pair of transistors is in the conduction condition.

7. A sum generator circuit according to claim 5 in which said coupling means connecting the collectors of the transistors of the first pair of transistors to the emitter of the other transistor and to the base of the one transistor of the second pair of transistors comprises a coupling circuit means including a coupling transistor having its emitter connected directly to the collectors of the first pair of transistors, its collector connected directly to the emitter of the other transistor and to the base of the one transistor of the second pair of transistors, and its base connected to the source of reference potential;

said coupling circuit means being operable to produce a first signal condition at the emitter of the other transistor and at the base of the one transistor of the second pair of transistors when a transistor of the first pair of transistors is in the conduction condition, said coupling circuit means being operable to produce a second signal condition at the emitter of the other transistor and the base of the one transistor of the second pair of transistors when both of the transistors of the first pair of transistors are in the non-conduction condition, and said coupling circuit means being operable to prevent current flow from the second pair of transistors to the exclusive-OR output circuit means.

8. A logic circuit including in combination
a first input terminal;
a second input terminal;
a first circuit means including a first transistor having its base connected to the first input terminal;
a second circuit means including a second transistor having its base connected to the second input terminal;
a collector output connection connected to the collector of the first transistor and to the collector of the second transistor;
said first circuit means being operable to produce signals at the collector output connection and at the emitter of the first transistor in response to the presence of a signal at the first input terminal;
said second circuit means being operable to produce signals at the collector output connection and at the emitter of the second transistor in response to the presence of a signal at the second input terminal;
a third circuit means connected to the emitter of the first transistor and having a first output connection and operable to produce a signal at the first output connection in response to the presence of a signal at the emitter of the first transistor;
said third circuit means including a third transistor having its base connected to the emitter of the first transistor and its collector connected to the first output connection; and
a fourth circuit means connected to the emitter of the second transistor and having a second output connection and operable to produce a signal at the second output connection in response to the presence of a signal at the emitter of the second transistor;
said fourth circuit means including a fourth transistor having its base connected to the emitter of the second transistor and its collector connected to the second output connection; whereby
a signal is produced at the collector output connection in response to the presence of a signal at either the first input terminal or at the second input terminal, a signal is produced at the first output connection in response to the presence of a signal at the first input terminal, and a signal is produced at the second input connection in response to the presence of a signal at the second input terminal.

9. A logic circuit including in combination
a first input terminal;
a second input terminal;
a first input circuit means including a first input transistor having its emitter connected to the first input terminal and its base connected to a first source of reference potential;
a second input circuit means including a second input transistor having its emitter connected to the second .input terminal end its base connected to the first source of reference potential;
a first intermediate transistor having its base connected directly to the collector of the first input transistor, its collector connected through a resistance to the first source of reference potential, and its emitter connected through a resistance to a second source of reference potential;
a second intermediate transistor having its base connected directly to the collector of the second input transistor, its collector connected directly to the collector of the first intermediate transistor, and its emitter connected through a resistance to the second source of reference potential;
said first input circuit means being operable to bias the first intermediate transistor to a low conduction condition in response to the presence of a first input signal condition at the first input transistor, and being operable to bias the first intermediate transistor to a high conduction condition in response to the presence of a second input signal condition at the first input terminal;
said second input circuit means being operable to bias the second intermediate transistor to a low conduction condition in response to the presence of the first input signal condition at the second input transistor, and being operable to bias the second intermediate transistor to a high conduction condition in response to the presence of the second input signal condition at the second input terminal;
a first output circuit means including a first output transistor having its base connected directly to the emitter of the first intermediate transistor, its collector connected through a resistance to the first source of reference potential, and its emitter connected to the second source of reference potential;
a second output circuit means including a second output transistor having its base connected directly to the emitter of the second intermediate transistor, its collector connected through a resistance to the first source of reference potential, and its emitter connected to the second source of reference potential;
a first output connection connected directly to the collector of the first output transistor;
a second output connection connected directly to the collector of the second output transistor;
said first output circuit means being operable to bias the first output transistor to the conduction condition and produce a first output signal condition at the first output connection when the first intermediate transistor is in the high conduction condition, and being operable to bias the first output transistor to the non-conduction condition and produce a second output signal condition at the first output connection when the first intermediate transistor is in the low conduction condition;
said second output circuit means being operable to bias the second output transistor to the conduction condition and produce the first output signal condition at the second output connection when the second intermediate transistor is in the high conduction condition, and being operable to bias the second output transistor to the non-conduction condition and produce the second output signal condition at the second output connection when the second intermediate transistor is in the low conduction condition; and
a collector output connection connected directly to the collectors of the first and second intermediate transistors whereby one signal condition is produced at the collector output connection when both the first and second intermediate transistors are in the low conduction condition and another signal condition is produced at the collector output connection when either the first or the second intermediate transistor is in the high conduction condition.

References Cited

UNITED STATES PATENTS

| | | | |
|---|---|---|---|
| 3,188,453 | 6/1965 | Schneider | 235—175 |
| 3,196,260 | 7/1965 | Pugmire | 235—173 |
| 3,317,721 | 5/1967 | Berlind | 235—176 |
| 3,353,009 | 11/1967 | Mohnkern | 235—168 |

MARTIN P. HARTMAN, *Primary Examiner.*

DAVID H. MALZAHN, *Assistant Examiner.*

U.S. Cl. X.R.

235—123